(12) United States Patent
Liu et al.

(10) Patent No.: US 11,409,704 B2
(45) Date of Patent: Aug. 9, 2022

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Bing Liu, Tianjin (CN); Wei Lin, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 281 days.

(21) Appl. No.: 16/285,201

(22) Filed: Feb. 26, 2019

(65) Prior Publication Data
US 2020/0117640 A1 Apr. 16, 2020

(30) Foreign Application Priority Data
Oct. 12, 2018 (CN) .......................... 201811191538.X

(51) Int. Cl.
*G06F 16/17* (2019.01)
*G06F 16/18* (2019.01)
(Continued)

(52) U.S. Cl.
CPC ...... *G06F 16/1734* (2019.01); *G06F 11/3419* (2013.01); *G06F 11/3476* (2013.01); *G06F 16/178* (2019.01); *G06F 16/1815* (2019.01)

(58) Field of Classification Search
CPC ............. G06F 16/1734; G06F 16/1815; G06F 16/178; G06F 11/3419; G06F 11/3476
(Continued)

(56) References Cited

U.S. PATENT DOCUMENTS 5,944,838 A * 8/1999 Jantz ................... G06F 11/1443
714/6.22
9,485,160 B1 * 11/2016 Brooker .............. G06F 11/0751
(Continued)

FOREIGN PATENT DOCUMENTS

WO WO-2018149487 A1 * 8/2018 .......... G06F 11/1461

*Primary Examiner* — Ashish Thomas
*Assistant Examiner* — Abdullah A Daud
(74) *Attorney, Agent, or Firm* — Womble Bond Dickinson (US) LLP

(57) ABSTRACT

Embodiments of the present disclosure provide a method, a device and a computer program product for managing a storage system. A method of managing a storage system comprises: determining whether a response time of a file system operation occurring in the storage system exceeds a first predetermined threshold, wherein the storage system comprises at least a memory and a plurality of storage devices and wherein the file system operation synchronizes data stored in the memory to at least one storage device from the plurality of storage devices. The method comprises: in response to the response time exceeding the first predetermined threshold, obtaining trace information related to the file system operation. In addition, the method further comprises determining, by analyzing the trace information, one or more factors that cause timeout of the file system operation. Embodiments of the present disclosure are capable of automatically determining a cause for the timeout of the file system operation in the storage system, thereby improving the management efficiency of the storage system.

21 Claims, 7 Drawing Sheets

(51) Int. Cl.
 *G06F 11/34* (2006.01)
 *G06F 16/178* (2019.01)
(58) Field of Classification Search
 USPC ........................................................ 707/634
 See application file for complete search history.

(56) References Cited

U.S. PATENT DOCUMENTS

| | | | | |
|---|---|---|---|---|
| 10,534,796 | B1* | 1/2020 | Lieberman | G06F 16/184 |
| 2004/0044770 | A1* | 3/2004 | Messick | H04L 29/06 |
| | | | | 709/226 |
| 2009/0228666 | A1* | 9/2009 | Kurashige | G06F 12/0246 |
| | | | | 711/E12.001 |
| 2012/0317316 | A1* | 12/2012 | Chakhaiyar | G06F 3/0659 |
| | | | | 710/11 |
| 2014/0028436 | A1* | 1/2014 | Osako | G08C 19/00 |
| | | | | 340/3.2 |
| 2015/0095973 | A1* | 4/2015 | Neumueller | H04L 63/20 |
| | | | | 726/1 |
| 2015/0100617 | A1* | 4/2015 | Diederich | H04L 67/325 |
| | | | | 709/201 |
| 2015/0178125 | A1* | 6/2015 | van der Lugt | G06F 9/4881 |
| | | | | 718/102 |
| 2015/0281029 | A1* | 10/2015 | Callahan | A63F 13/335 |
| | | | | 709/224 |
| 2016/0117259 | A1* | 4/2016 | Hasegawa | G06F 12/121 |
| | | | | 711/133 |
| 2016/0162366 | A1* | 6/2016 | Oberhofer | G06F 11/1469 |
| | | | | 707/645 |
| 2016/0248642 | A1* | 8/2016 | Rajasekar | G06F 11/3466 |
| 2018/0239549 | A1* | 8/2018 | Zhang | G06F 3/0619 |
| 2018/0239686 | A1* | 8/2018 | Liu | G06F 11/348 |
| 2018/0241644 | A1* | 8/2018 | Lu | H04L 43/0817 |
| 2018/0260125 | A1* | 9/2018 | Botes | G06F 3/065 |
| 2018/0335976 | A1* | 11/2018 | DeRosa | G06F 3/0611 |
| 2019/0045028 | A1* | 2/2019 | Wysocki | H04L 43/0852 |
| 2019/0155792 | A1* | 5/2019 | Jeong | G06F 9/544 |
| 2019/0334795 | A1* | 10/2019 | Terayama | H04L 41/0893 |
| 2019/0354442 | A1* | 11/2019 | Yeger | G06F 3/0604 |

* cited by examiner

METHOD, DEVICE AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 201811191538.X, filed Oct. 12, 2018, entitled "METHOD, DEVICE AND COMPUTER PROGRAM PRODUCT FOR MANAGING STORAGE SYSTEM," which is incorporated by reference herein in its entirety.

FIELD

Embodiments of the present disclosure generally relate to the field of data storage, and specifically to a method, a device and a computer program product for managing a storage system.

BACKGROUND

A journaling file system is usually deployed in a modern storage system. The journaling file system will record a write action for a storage device (e.g., a disk etc.) entirely into a journaling area of the storage device so that it can be recalled and traced when necessary. In a journaling file system such as 3rd generation extended file system (EXT3) or 4th generation extended file system (EXT4), there may be a large latency for a file system operation (for example, an fsync call) for synchronizing file data stored in a memory to a storage device. The file system operation may involve a plurality of components in the storage system, which makes it difficult to trace a cause of a problem when the storage system is deployed in a user's production environment and a timeout of a response of the file system operation occurs. In some cases, upon the response of the file system operation timeout, it is possible to cause an application initiating the operation cannot work properly, and affect other services of the storage system.

SUMMARY

Embodiments of the present disclosure provide a method, a device and a computer program product for managing a storage system.

According to a first aspect of the present disclosure, there is provided a method of managing a storage system. The method comprises: determining whether a response time of a file system operation occurring in the storage system exceeds a first predetermined threshold, the storage system comprising at least a memory and a plurality of storage devices and the file system operation synchronizing data stored in the memory to at least one storage device from the plurality of storage devices; in response to the response time exceeding the first predetermined threshold, obtaining trace information related to the file system operation; and determining, by analyzing the trace information, one or more factors that cause timeout of the file system operation.

According to a second aspect of the present disclosure, there is provided a device for managing a storage system. The device comprises at least one processing unit and at least one memory. The at least one memory is coupled to the at least one processing unit and having instructions stored thereon which when executed by the at least one processing unit cause the device to perform acts comprising: determining whether a response time of a file system operation occurring in the storage system exceeds a first predetermined threshold, the storage system comprising at least a memory and a plurality of storage devices and the file system operation synchronizing data stored in the memory to at least one storage device from the plurality of storage devices; in response to the response time exceeding the first predetermined threshold, obtaining trace information related to the file system operation; and determining, by analyzing the trace information, one or more factors that cause timeout of the file system operation.

According to a third aspect of the present disclosure, there is provided a computer program product being tangibly stored on a non-transitory computer storage medium and includes machine-executable instructions which, when executed by a device, cause the device to perform any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

FIGS. 5-6 illustrate schematic diagrams of example trace information related to I/O operation re-queuing according to embodiments of the present disclosure;

FIG. 7 illustrates a schematic diagram of example trace information related to I/O operation splitting according to embodiments of the present disclosure;

FIG. 8 illustrates a schematic diagram of example trace information related to I/O address space overlap according to an embodiment of the present disclosure;

In all figures, the same or corresponding reference numbers denote the same or corresponding parts.

DETAILED DESCRIPTION OF EMBODIMENTS

Figure 1:
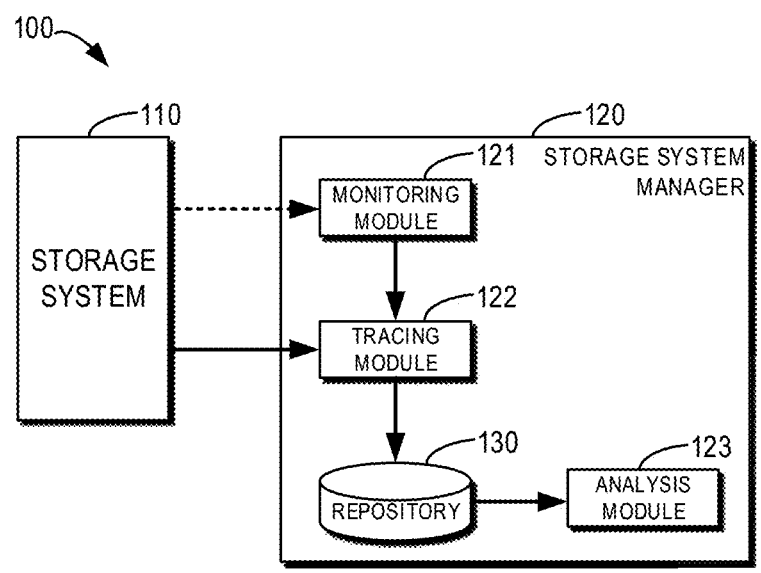
FIG. 1 illustrates a schematic diagram of an example environment in which embodiments of the present disclosure can be implemented.

Preferred embodiments of the present disclosure will be described as follows in more detail with reference to the drawings. Although the preferred embodiments of the present disclosure are illustrated in the drawings, it should be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment". The term "another embodiment" is to be read as "at least one other embodiment". Terms "a first", "a second" and others may denote different or identical objects. The following text may also contain other explicit or implicit definitions.

As stated above, in a journaling file system such as EXT3 or EXT4, there may be large latency for a file system operation for synchronizing file data stored in a memory to a storage device may have a large latency. The file system operation might involve a plurality of components in a storage system, which makes it difficult to trace a cause of a problem when the storage system is deployed into a user's production environment and a file system operation response timeout occurs. In some cases, upon the file system operation response timeout, it is possible to cause an application initiating the operation cannot to work properly, and affect other services of the storage system.

Embodiments of the present disclosure propose a solution for managing a storage system to solve one or more of the problems mentioned above and other potential problems. According to this solution, when a response time of a file system operation occurring in the storage system exceeds a predetermined threshold, trace information related to the file system operation is obtained. It is possible to determine, by analyzing the obtained trace information, one or more factors that cause for timeout of the file system operation. In this way, the solution can automatically determine the cause for timeout of the file system operation in the storage system, thereby improving the management efficiency of the storage system. Furthermore, this solution enables targeted optimization of the storage system for the determined cause.

Embodiments of the present disclosure will be described in detail below with an fsync operation as an example of file system operation. However, it should be understood that this is for the purpose of illustration only and does not imply any limitation of the scope of the disclosure. Embodiments of the present disclosure are also applicable to other file system operations.

FIG. 1 illustrates a schematic diagram of an example environment 100 in which embodiments of the present disclosure can be implemented. As shown in FIG. 1, the environment 100 may include a storage system 110 and a storage system manager 120. It should be understood that the structure and functionality of the example environment 100 as shown in FIG. 1 is for illustrative purposes only and is not intended to limit the scope of the disclosure. Embodiments of the present disclosure may be implemented in environments having different structures and/or functions.

For example, the storage system 110 may include a processor, a memory, and various storage devices (not shown in FIG. 1) and is capable of storing data desired by a user into a respective storage device in response to a request of the user, and providing the user with an access to these data. It should be appreciated that the storage system 110 as shown in FIG. 1 may be any storage system that already exists or will be developed, and it may have any suitable structure and includes any number of storage devices (such as magnetic disks).

The storage system manager 120 may be used to manage the storage system 110, and it may generally include a monitoring module 121, one or more tracing modules 122, and one or more analysis modules 123. The modules 121-123 in the storage system manager 120 may be implemented in a separate device or implemented in different devices respectively. Moreover, although the storage system manager 120 and storage system 110 are illustrated as being separate from each other in FIG. 1, it should be understood that one or more modules of the storage system manager 120 may for example be integrated into the storage system 110 as a plug-in. The scope of the present disclosure is not limited in this respect.

In some embodiments, the monitoring module 121 may be configured to detect a response time of a file system operation (e.g., an fsync operation) occurring in the storage system 110. For example, the monitoring module 121 may record a start time and an end time of the file system operation and determine the response time of the file system operation based on the difference between the two. When the response time exceeds a predetermined threshold (also referred to herein as a "a first predetermined threshold", for example 30s), the monitoring module 121 may activate one or more tracing modules 122 to collect trace information related to file system operation from the storage system 110. In some embodiments, one or more tracing modules 122 may store the collected trace information into a repository 130 in order not to affect the performance and storage space of the storage system 110. For example, the repository 130 may be a separate storage device or a cloud storage system. The analysis module 123 may obtain the trace information from the repository 130 and determine, by analyzing the trace information, one or more factors that cause timeout of the file system operation.

Figure 2:
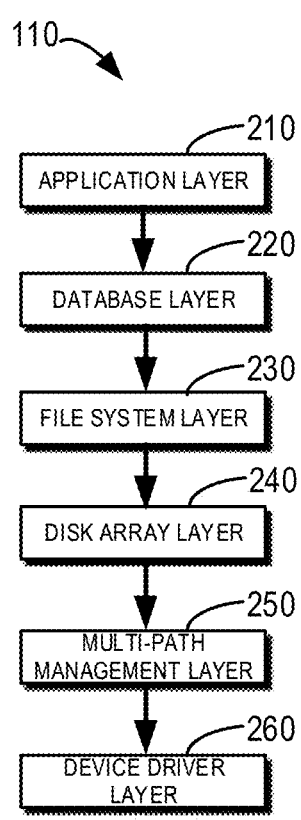
FIG. 2 illustrates a schematic diagram of a plurality of input/output (I/O) operation layers divided from a storage system according to embodiments of the present disclosure.

According to a path experienced by the input/output (I/O) operation in storage system 110, the storage system 110 may be divided into a plurality of I/O operation layers. The "I/O operation layer" described herein refers to a processing module that an I/O operation undergoes, and a plurality of I/O operation layers are also referred to as an I/O stack. FIG. 2 exemplarily shows a schematic diagram of a plurality of I/O operation layers divided from the storage system 110 according to embodiments of the present disclosure. As shown in FIG. 2, the storage system 110 for example may be divided into an application layer 210, a database layer 220, a file system layer 230, a disk array layer 240, a multipath management layer 250, and a device driver layer 260. For example, an I/O operation may be initiated directly by the application layer 210 or initiated at the database layer 220 by applying an operation for a database. The initiated I/O operation may be forwarded, split, or merged via one or more I/O operation layers, and ultimately reaches one or more storage devices managed by the device driver layer 260 so as to be executed. It should be understood that the plurality of I/O operation layers of the storage system 110 illustrated in FIG. 2 are merely exemplary and are not intended to limit the scope of the disclosure. According to specific implementation of the storage system 110, the I/O operation layer in the storage system 110 may be different from those shown in FIG. 2.

Figure 3:
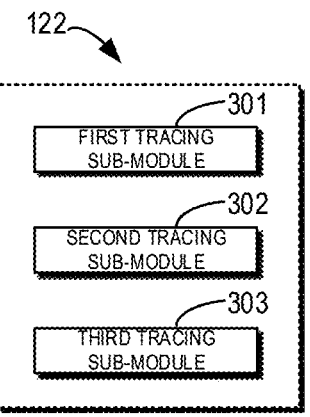
FIG. 3 illustrates a block diagram of a tracing module according to embodiments of the present disclosure.

In some embodiments, the tracing module 122 as shown in FIG. 1 may include a plurality of sub-modules. FIG. 3 shows a block diagram of a tracing module 122 in accordance with embodiments of the present disclosure. As shown in FIG. 3, for example, the tracing module 122 may include a first tracing sub-module 301, a second tracing sub-module 302, and a third tracing sub-module 303. The first tracing sub-module 301 is also referred to as an application tracing sub-module, for example, the first tracing sub-module 301 obtains, from the application layer 210 and/or the database layer 220 as shown in FIG. 2, trace information (also referred to herein as "first trace information") related to the process. The second tracing sub-module 302 is also referred to as an I/O stack tracing sub-module, for example, the second tracing sub-module 302 obtains, from the disk array layer 240, the multi-path management layer 250, and/or the device driver layer 260, trace information (also referred to as "second trace information herein) related to each I/O layer. The third tracing sub-module 303 is also referred to as a storage device tracing sub-module, for example the third tracing sub-module 303 obtains, from a plurality of storage devices in the storage system 110, trace information (also referred to herein as "fourth trace information") related to the plurality of storage devices. It should be understood that the number of sub-modules of the tracing module 122 shown in FIG. 3 is merely exemplary and does not imply any limitation to the scope of the present disclosure. In other embodiments, the tracing module 122 may include any number of sub-modules, or the plurality of tracing sub-modules may be combined into a single module as shown in FIG. 3.

In some embodiments, the first tracing sub-module 301 may record the I/O activity of each process with any existing or future-developed tools (for example, a taskstat tool supported in a Linux kernel). For example, the sub-module 301 may collect a throughput of read/write of each process on the storage device and the number of calls of read/write system invoked by each process. In some embodiments, the sub-module 301 may make statistics for the number of fsync calls invoked by each process. These data may be used to analyze which processes have unusual I/O activity upon timeout of the response to the fsync call, and thereby determining factors that cause the timeout of the fsync call.

In some embodiments, the second tracing sub-module 302 may record the I/O activity of each I/O operation layer in the entire I/O stack with any existing or future-developed tools (e.g., a blktrace tool supported in the Linux kernel). For example, the sub-module 302 may record details of the operation of one I/O in each I/O operation layer, such as, when it is sent to a I/O request queue, whether to merge with other I/Os, whether an I/O re-queue happens, when it is dispatched to a next I/O operation layer and when the it is completed, etc. The information may be used to analyze which I/O operation layers have unusual I/O activity upon timeout of the response to the fsync call, and thereby determining factors that cause the timeout of the fsync call.

In some embodiments, the third tracing sub-module 303 may obtain trace information related to the plurality of storage devices with any existing or future-developed tools. For example, the third tracing sub-module 303 may periodically collect automatic detection analysis and reporting (SMART) data from the plurality of storage devices.

Figure 4:
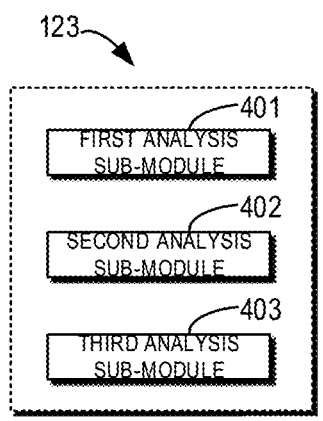
FIG. 4 illustrates a block diagram of an analysis module according to embodiments of the present disclosure.

In some embodiments, the analysis module 123 as shown in FIG. 1 may include a plurality of sub-modules. FIG. 4 shows a block diagram of an analysis module 123 in accordance with embodiments of the present disclosure. As shown in FIG. 4, for example, the analysis module 123 may include a first analysis sub-module 401, a second analysis sub-module 402, and a third analysis sub-module 403. It should be understood that the number of sub-modules in the analysis module 123 shown in FIG. 4 is merely exemplary and does not imply any limitation to the scope of the present disclosure. In other embodiments, the analysis module 123 may include any number of sub-modules, or a plurality of analysis sub-modules as shown in FIG. 4 may be combined into a single module.

In some embodiments, the first analysis sub-module 401 is also referred to as a process analysis sub-module, which, for example, analyzes the first trace information obtained by the application tracing sub-module 301 as shown in FIG. 3 and related to the process, to determine the factors that cause the timeout of fsync call.

In some embodiments, for example, the first analysis sub-module 401 may determine one or more processes in which an I/O bandwidth occupied within a predetermined time interval exceeds a predetermined threshold (referred to herein as "a second predetermined threshold") by analyzing the first trace information. For example, the first analysis sub-module 401 may utilize any existing or future-developed tools (e.g., an iotop tool) to obtain the read/write bandwidth of each process or thread during a predetermined sampling period and sort these read/write processes or threads according to the size of the read/write bandwidth. In some embodiments, when there is a workload that generates a large number of I/O operations to external storage devices but does not actually affect the file system performance, the first analysis sub-module 401 may exclude processes that generate these workloads. In some embodiments, a process or a thread in which the I/O bandwidth occupied within the predetermined time interval is the largest may be considered a factor that causes the timeout of the fsync call.

Additionally or alternatively, the first analysis sub-module 401 may determine, by analyzing the first trace information, a process in which the number of times of initiating the fsync operations within a predetermined time interval exceeds a predetermined threshold (also referred to herein as "a third predetermined threshold"). For example, the first analysis sub-module 401 may utilize any existing or future-developed tools (e.g., an iotop tool) to obtain the number of times of each process or thread initiating an fsync operation during a predetermined sampling period, and sort these processes or threads according to the number of times of initiating the fsync operation. In this way, it is possible to easily find out which processes or threads that initiate the fsync operation the most times. In some embodiments, the process or thread that initiate the fsync operation the most times within the predetermined time interval may be considered a factor that causes the timeout of the fsync call.

In some embodiments, the second analysis sub-module 402 is also referred to as an I/O stack analysis sub-module, which for example analyzes the second trace information obtained by the I/O stack tracing sub-modules 302 as shown in FIG. 3 and related to each I/O layer, to determine the factor that causes the timeout of the fsync call.

In some embodiments, the second analysis sub-module 402 may determine a latency of each of the plurality of I/O operation layers by analyzing the second trace information, thereby determining one or more of the plurality of operation layers, whose latency exceeds a predetermined threshold (also referred to herein as "a fourth predetermined threshold"). For example, the I/O operation layer with the longest latency may be considered as a factor that causes the timeout of the fsync call.

Each I/O operation layer may include a plurality of stages. In some embodiments, for example, the second analysis sub-module 402 may further determine a latency time of each stage in the I/O operation layer with the longest latency, thereby determining one or more stages in a plurality of stages, whose latency exceeds a predetermine threshold (also referred to as "a fifth predetermined threshold"). For example, the stage with the longest latency in the I/O operation layer with the longest latency may be considered as a factor that causes the timeout of the fsync call.

In some embodiments, the second analysis sub-module 402 may analyze the second trace information based on a predetermined I/O problem model, to determine whether an I/O problem indicated by the predetermined I/O problem model happens to each of the plurality of I/O operation layers. For example, examples of I/O problems may include, but are not limited to, an I/O operation being re-queued, an I/O operation being split, and overlap among address spaces of different I/O operations, and the like. These I/O problems may be factors that cause the timeout of the fsync call. Detailed description will be presented with respect to each I/O problem.

In some embodiments, the second analysis sub-module 402 may traverse the second trace information to determine information related to I/O operation re-queuing. It is assumed that the second trace information is obtained by the blktrace tool supported in the Linux kernel, wherein the trace information related to the re-queuing of I/O operations may be marked with a specific character (for example, "R"). The specific character may indicate that the next I/O operation layer is busy or starts to adopt a strategy of throttling I/O, so it is necessary to temporarily avoid more I/O from being dispatched from the current I/O operation layer. As a result, the I/O needs to be re-queued or wait in the queue of the current I/O operation layer until the underlying device is idle or the throttling strategy is over.

Figures 5, 6:
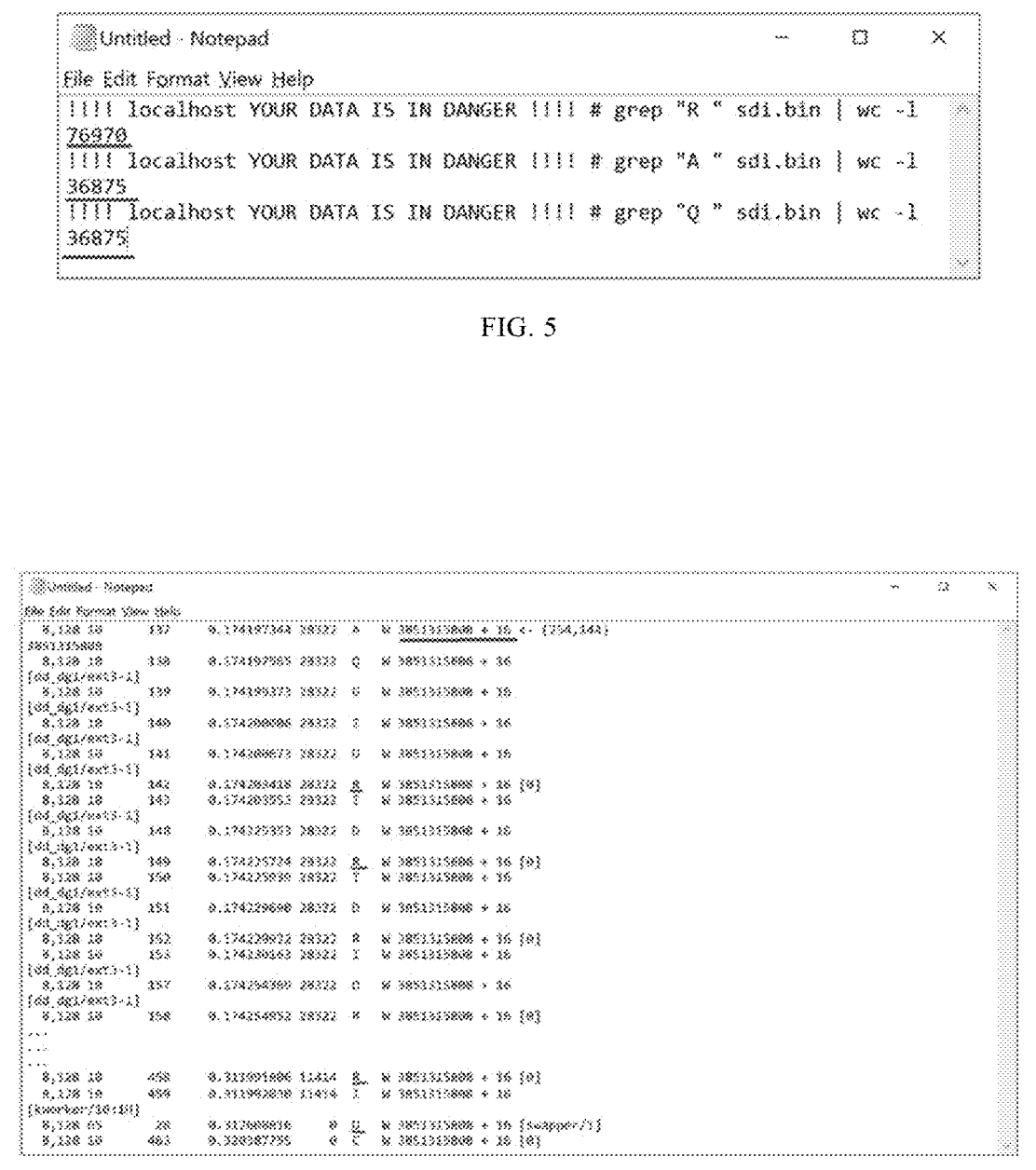

FIGS. 5-6 illustrate examples of trace information related to re-queuing of I/O operations in accordance with embodiments of the present disclosure. For example, FIG. 5 shows an example of trace information of a certain I/O operation layer obtained by the blktrace tool, wherein there are 76,970 pieces of trace information marked with the specific character "R" and there are 36,875 pieces of information marked with a specific character "Q", for example, the specific character "Q" may indicate the total number of I/Os arriving at the I/O request queue of the I/O operation layer. As can be seen from the trace information shown in FIG. 5, there are too many re-queued I/Os appear in the I/O operation layer (because 76,970>36875). FIG. 6 shows an example in which I/O operation layer is repeatedly re-queued in a certain I/O operation layer. For example, the processing of the I/O should have been completed within 10 ms (i.e., sent to the next I/O operation layer or sent to the storage device). However, since the I/O is repeatedly re-queued (e.g., as indicated by the character "R") in the current I/O operation layer, the I/O's latency in the current I/O operation layer reaches 150 ms. By identifying the I/O re-queue problem in a certain I/O operation layer, it is possible to determine that the I/O operation layer under the I/O operation layer is busy or adopts an I/O throttling strategy, thereby determining the factor that causes the timeout of the fsync call.

Figures 7, 8:
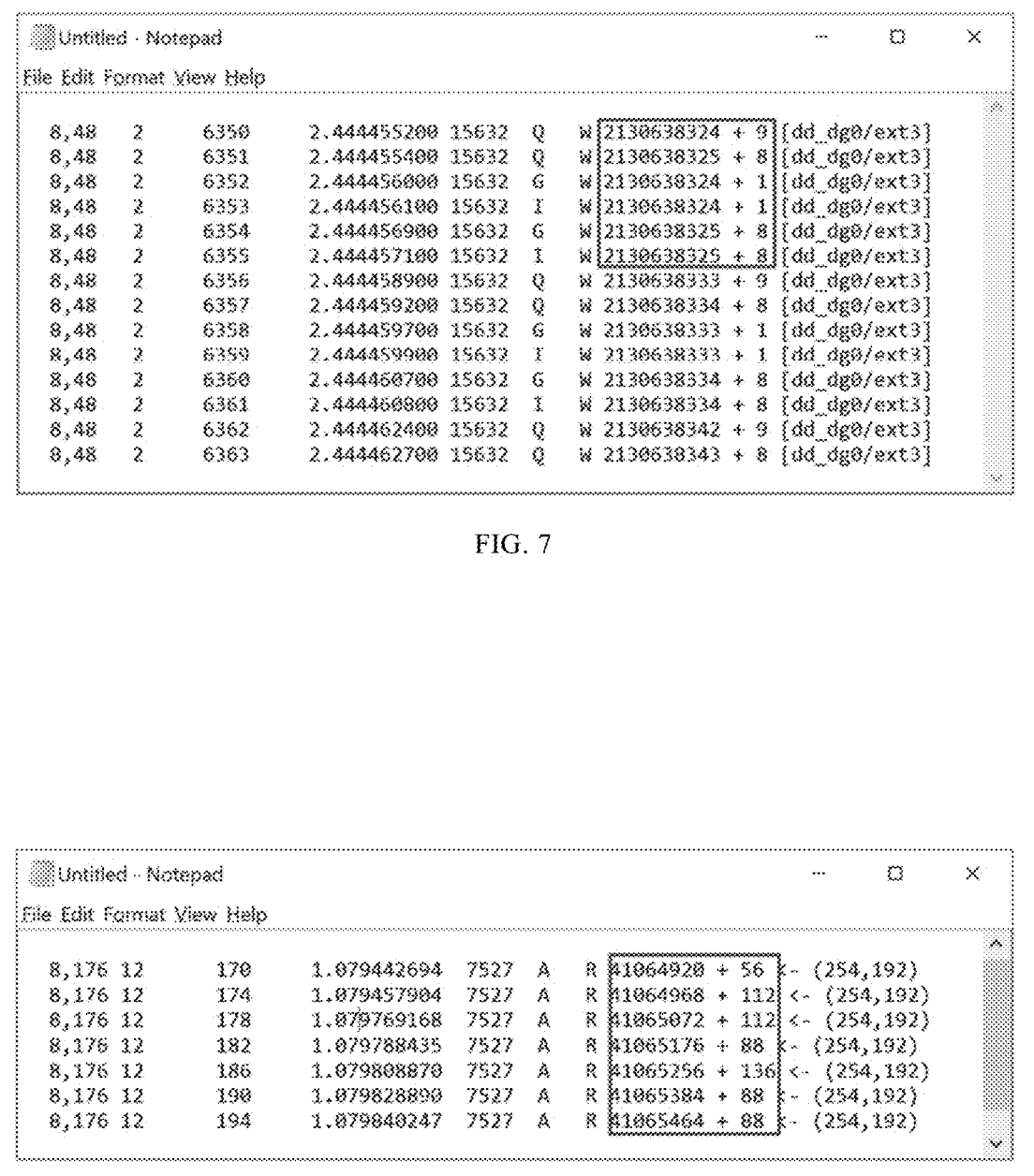

Additionally or alternatively, in some embodiments, the second analysis sub-module 402 may traverse the second trace information to determine information related to the I/O operation splitting. Splitting of the I/O operation means that an I/O operation is split into a plurality of separate I/O operations for some reason, which usually causes more processing overhead and reduces system performance. FIG. 7 illustrates an example of trace information related to I/O operation splitting in accordance with embodiments of the present disclosure. As shown in FIG. 7, the I/O operation "2130638324+9" (wherein "2130638324" refers to a start-ing offset address of the I/O, and "9" refers to the size of the target data for which I/O is performed) is split into "2130638324+1" and "2130638325+8". It is possible to identify factors that cause the timeout of the fsync call by recognizing the problem of the I/O operation splitting.

Additionally or alternatively, in some embodiments, the second analysis sub-module 402 may traverse the second trace information to determine information related to the I/O address space overlap. The I/O address space overlap refers to the overlap existing between address spaces of different I/O operations, without being fully merged, which usually causes more processing overhead and thus reduces the system performance. FIG. 8 illustrates an example of trace information related to the I/O address space overlap according to embodiments of the present disclosure. As shown in FIG. 8, there is the address space overlap between the I/O operation "41064920+56" and the I/O operation "41064968+112" because an ending address of the I/O operation "41064920+56" is "41064976", which is between a starting address "41064968" and an ending address "41065080" of the I/O operation "41064968+112". In addition, there is also a problem of the address space overlap among other I/O operations in FIG. 8. It is possible to identify factors that cause the timeout of the fsync call by recognizing the problem of the I/O address space overlap.

In some embodiments, the third analysis sub-module 403 is also referred to as a storage device analysis sub-module, which for example analyzes third trace information obtained by the storage device tracing sub-module 303 as shown in FIG. 3 and related to a plurality of storage devices (e.g., magnetic disks), to determine the factors that cause the timeout of the fsync call. In some embodiments, the third analysis sub-module 403 may determine, from the plurality of storage devices, a storage device which gets abnormal by analyzing the SMART data obtained by the storage device tracing sub-module 303. For example, when the number of reallocated sectors of a disk exceeds a predetermined threshold, this may indicate that the disk fails. If the disk is one of the disks involved in the fsync call, the failure of the disk may be considered as a factor that causes the timeout of the fsync call.

Figure 9:
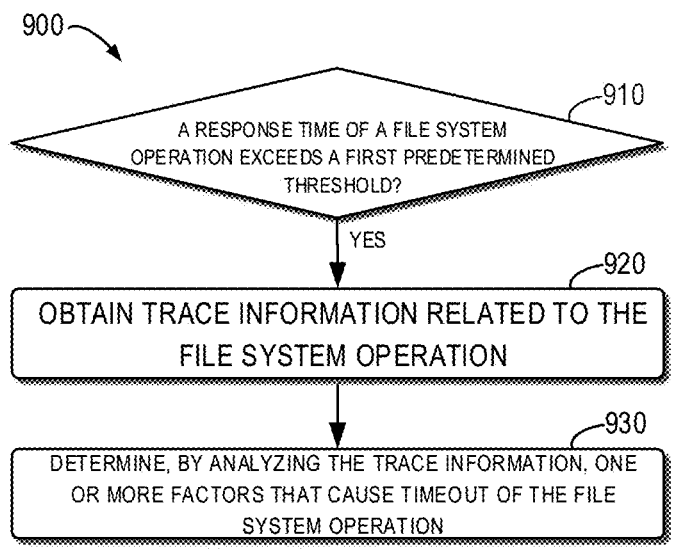
FIG. 9 illustrates a flow chart of an example method of managing a storage system according to embodiments of the present disclosure.

FIG. 9 illustrates a flow chart of an example method 900 of managing a storage system according to an embodiment of the present disclosure. For example, method 900 may be performed by storage system manager 120 as shown in FIG. 1. It should be understood that the method 900 may also include additional actions not shown and/or the illustrated actions may be omitted, and the scope of the present disclosure is not limited in this respect.

At block 910, the storage system manager 120 determines whether a response time of a file system operation occurring in the storage system exceeds a first predetermined threshold, the storage system comprising at least a memory and a plurality of storage devices and the file system operation synchronizing data stored in the memory to at least one storage device from the plurality of storage devices.

At block 920, in response to the response time exceeding the first predetermined threshold, the storage system manager 120 obtains trace information related to the file system operation.

At block 930, the storage system manager 120 determines, by analyzing the trace information, one or more factors that cause timeout of the file system operation.

In some embodiments, the storage system manager 120 may obtain first trace information related to one or more processes running in the storage system and determine one or more factors by analyzing the first trace information.

In some embodiments, the storage system manager 120 may determine, from one or more processes, a process as one of the one or more factors, an input/output bandwidth occupied by the determined process within a predetermined time interval exceeding a second predetermined threshold.

In some embodiments, the storage system manager 120 may determine, from one or more processes, a process as one of the one or more factors, the number of times the determined process initiates the file system operation within a predetermined time interval exceeding a third predetermined threshold.

In some embodiments, the storage system is divided into a plurality of input/output (I/O) operation layers, and the file system operation involves one or more of the plurality of I/O operation layers. The storage system manager 120 may obtain second trace information related to the one or more I/O operation layers and determine the one or more factors by analyzing the second trace information.

In some embodiments, the storage system manager 120 may determine, from one or more I/O operation layers, an I/O operation layer as one of the one or more factors, a latency in the determined I/O operation layer exceeding a fourth predetermined threshold.

In some embodiments, the I/O operation layer includes a plurality of stages. The storage system manager 120 may determine, from the plurality of stages, a stage as one of the one or more factors, a latency in the determined stage exceeding a fifth predetermined threshold.

In some embodiments, the second trace information comprises third trace information related to one of the one or more I/O operation layers. The storage system manager 120 may determine the one or more factors by the following operations: obtaining an I/O problem model indicating an occurrence of a predetermined I/O problem; matching the third trace information with the I/O problem model; in response to the third trace information matching with the I/O problem model, determining that the predetermined I/O problem occurs at the I/O operation layer; and determining one or more factors based on the predetermined I/O problem occurring at the I/O operation layer.

In some embodiments, the predetermined I/O problem comprises at least one of the following: an I/O operation being re-queued; an I/O operation being split; and overlap among address spaces of different I/O operations.

In some embodiments, the storage system manager 120 may obtain fourth trace information related to the plurality of storage devices and determine the one or more factors by analyzing the fourth trace information.

In some embodiments, the storage system manager 120 may determine the one or more factors through the following operations: determining from the plurality of storage device a storage device whose performance is below a sixth predetermined threshold; and in response to the storage device being included in the at least one storage device, determining the storage device as one of the one or more factors.

In some embodiments, the file system in the storage system is a journaling file system.

Figure 10:
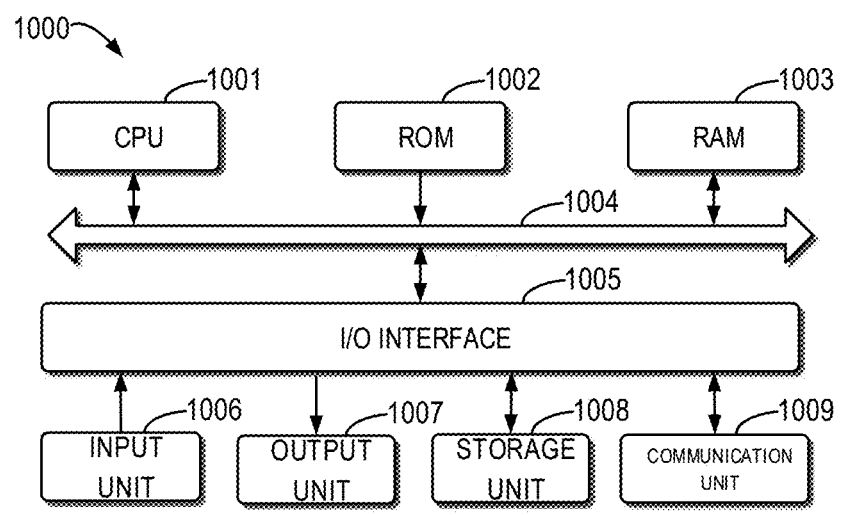
FIG. 10 illustrates a schematic block diagram of an example device for implementing embodiments of the present disclosure.

FIG. 10 illustrates a schematic block diagram of an example device 1000 for implementing embodiments of the present disclosure. For example, the storage system manager 120 as shown in FIG. 1 may be implemented by the device 1000. As shown in FIG. 10, the device 1000 comprises a central processing unit (CPU) 1001 that may perform various appropriate actions and processing according to computer program instructions stored in a read-only memory (ROM) 1002 or computer program instructions loaded from a memory unit 1008 to a random access memory (RAM) 1003. In the RAM 1003, there further store various programs and data needed for operations of the device 1000. The CPU 1001, ROM 1002 and RAM 1003 are connected to each other via a bus 1004. An input/output (I/O) interface 1005 is also connected to the bus 1004.

Various components in the device 1000 are connected to the I/O interface 1005, including: an input unit 1006 for example, a keyboard, a mouse and the like; an output unit 10010 including various kinds of displays and loudspeakers, etc.; a storage unit 1008 including a magnetic disk, an optical disk, and etc.; a communication unit 1009 including a network card, a modem, and a wireless communication transceiver, etc. The communication unit 1009 allows the device 1000 to exchange information/data with other devices through a computer network such as the Internet and/or various kinds of telecommunications networks.

Various processes and processing described above, e.g., the process 900 may be executed by the processing unit 1001. For example, in some embodiments, the process 900 may be implemented as a computer software program that is tangibly included in a machine-readable medium, e.g., the storage unit 1008. In some embodiments, part or the entire computer program may be loaded and/or mounted onto the device 1000 via the ROM 1002 and/or communication unit 1009. When the computer program is loaded to the RAM 1003 and executed by the CPU 1001, one or more acts of the process 900 as described above may be performed.

The present disclosure may be a method, a device, a system and/or a computer program product. The computer program product may include a computer-readable storage medium on which computer-readable program instructions for executing various aspects of the present disclosure are loaded.

The computer-readable storage medium may be a tangible device that may retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or a network interface in each computing/processing device receives computer readable program instructions from the network and forwards the computer-readable program instructions for storage in a computer-readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, device (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which are executed via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which are executed on the computer, other programmable device, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
   determining a response time based on a difference between a start time and an end time of an operation of a file system performed to synchronize data stored in at least one memory of the storage system to at least one storage device of a plurality of storage devices of the storage system;
   determining whether the response time of the operation of the file system occurring in the storage system exceeds a first predetermined threshold;
   in response to the response time exceeding the first predetermined threshold, obtaining trace information related to the operation of the file system, wherein the trace information is related to a particular input/output (I/O) operation layer of one of the one or more I/O operation layers;
   storing the trace information into a repository in order not to affect performance of the operation of the file system and a storage space of the storage system, wherein the trace information includes a throughput of each of a plurality of I/O operations for each of a plurality of I/O operation layers of the storage system; and
   determining, by analyzing the trace information, one or more factors that cause timeout of the operation of the file system, wherein the one or more factors includes an I/O operation being re-queued, an I/O operation being split, and an overlap among address spaces of different I/O operations;
   wherein determining the one or more factors by analyzing the trace information comprises:
   obtaining an I/O problem model indicating an occurrence of a predetermined I/O problem;

matching the trace information with the I/O problem model;

in response to the trace information matching with the I/O problem model, determining that the predetermined I/O problem occurs at the particular I/O operation layer; and determining the one or more factors based on the predetermined I/O problem occurring at the particular I/O operation layer.

2. The method according to claim 1, wherein obtaining the trace information further comprises:

obtaining first trace information related to each system call invoked by each I/O operation in the storage system; and wherein determining the one or more factors comprises: determining the one or more factors by analyzing the first trace information.

3. The method according to claim 2, wherein determining the one or more factors by analyzing the first trace information comprises:

determining one of the I/O operations as one of the one or more factors, an input/output (I/O) bandwidth occupied by the determined I/O operation within a predetermined time interval exceeding a second predetermined threshold.

4. The method according to claim 2, wherein determining the one or more factors by analyzing the first trace information comprises:

determining one of the I/O operations as one of the one or more factors, a number of times the determined I/O operation initiates the operation of the file system within a predetermined time interval exceeding a third predetermined threshold.

5. The method according to claim 1, wherein determining the one or more factors further comprises:

determining, from the plurality of I/O operation layers, an I/O operation layer as one of the one or more factors, a latency in the determined I/O operation layer exceeding a fourth predetermined threshold.

6. The method according to claim 5, determining the one or more factors by analyzing the trace information further comprises:

determining, from the plurality of stages, a stage as one of the one or more factors, the latency in the determined stage exceeding a fifth predetermined threshold.

7. The method according to claim 1, wherein obtaining the trace information comprises:
obtaining trace information related to the plurality of storage devices; and wherein determining the one or more factors comprises:
determining the one or more factors by analyzing the trace information.

8. The method according to claim 7, wherein determining the one or more factors by analyzing the trace information comprises:

determining, from the plurality of storage devices, a storage device whose performance is below a sixth predetermined threshold; and in response to the storage device being included in the at least one storage device, determining the storage device as one of the one or more factors.

9. The method according to claim 1, wherein the file system in the storage system is a journaling file system.

10. A device for managing a storage system, comprising:
at least one processing unit; and
at least one memory, the at least one memory being coupled to the at least one processing unit and having instructions stored thereon which when executed by the at least one processing unit cause the device to perform operations, the operations comprising:

determining a response time based on a difference between a start time and an end time of an operation of a file system performed to synchronize data stored in the at least one memory of the storage system to at least one storage device of a plurality of storage devices of the storage system;

determining whether the response time of the operation of the file system occurring in the storage system exceeds a first predetermined threshold;

in response to the response time exceeding the first predetermined threshold, obtaining trace information related to the operation of the file system, wherein the trace information is related to a particular input/output (I/O) operation layer of one of the one or more I/O operation layers;

storing the trace information into a repository in order not to affect performance of the operation of the file system and a storage space of the storage system, wherein the trace information includes a throughput of each of a plurality of input/output (I/O) operations for each of a plurality of I/O operation layers of the storage system; and determining, by analyzing the trace information, one or more factors that cause timeout of the operation of the file system, wherein the one or more factors includes an I/O operation being re-queued, an I/O operation being split, and an overlap among address spaces of different I/O operations;

wherein determining the one or more factors by analyzing the trace information comprises:

obtaining an I/O problem model indicating an occurrence of a predetermined I/O problem;

matching the trace information with the I/O problem model;

in response to the trace information matching with the I/O problem model, determining that the predetermined I/O problem occurs at the particular I/O operation layer; and determining the one or more factors based on the predetermined I/O problem occurring at the particular I/O operation layer.

11. The device according to claim 10,
wherein obtaining the trace information comprises:
obtaining first trace information related to each system call invoked by each I/O operation in the storage system; and wherein the determining the one or more factors comprises:
determining one or more factors by analyzing the first trace information.

12. The device according to claim 11, wherein determining the one or more factors by analyzing the first trace information comprises:

determining one of the I/O operations as one of the one or more factors, an input/output bandwidth occupied by the determined I/O operation within a predetermined time interval exceeding a second predetermined threshold.

13. The device according to claim 11, wherein determining the one or more factors by analyzing the first trace information comprises:

determining one of the I/O operations as one of the one or more factors, a number of times the determined I/O operation initiates the operations of the file system within a predetermined time interval exceeding a third predetermined threshold.

14. The device according to claim 10, wherein determining the one or more factors by analyzing the trace information comprises:
determining, from the plurality of I/O operation layers, an I/O operation layer as one of the one or more factors, a latency in the determined I/O operation layer exceeding a fourth predetermined threshold.

15. The device according to claim 14, wherein the one or more factors by analyzing the trace information further comprises:
determining, from the plurality of stages a stage, as one of the one or more factors, the latency in the determined stage exceeding a fifth predetermined threshold.

16. The device according to claim 10,
wherein obtaining the trace information comprises:
obtaining trace information related to the plurality of storage devices; and
wherein determining the one or more factors comprises:
determining the one or more factors by analyzing the trace information.

17. The device according to claim 16, wherein determining the one or more factors by analyzing the trace information comprises:
determining, from the plurality of storage devices, a storage device whose performance is below a sixth predetermined threshold; and
in response to the storage device being included in the at least one storage device, determining the storage device as one of the one or more factors.

18. The device according to claim 10, wherein the file system in the storage system is a journaling file system.

19. A non-transitory machine-readable medium having instructions stored therein, which when executed by a processor, cause the processor to perform operations, the operations comprising:
determining a response time based on a difference between a start time and an end time of an operation of a file system performed to synchronize data stored in at least one memory of a storage system to at least one storage device of a plurality of storage devices of the storage system;
determining whether a response time of the operation of the file system occurring in the storage system exceeds a first predetermined threshold;
in response to the response time exceeding the first predetermined threshold, obtaining trace information related to the operation of the file system, wherein the trace information is related to a particular input/output (I/O) operation layer of one of the one or more I/O operation layers;
storing the trace information into a repository in order not to affect performance of the operation of the file system and a storage space of the storage system, wherein the trace information includes a throughput of each of a plurality of input/output (I/O) operations for each of a plurality of I/O operation layers of the storage system; and
determining, by analyzing the trace information, one or more factors that cause timeout of the operation of the file system, wherein the one or more factors includes an I/O operation being re-queued, an I/O operation being split, and an overlap among address spaces of different I/O operations;
wherein determining the one or more factors by analyzing the trace information comprises:
obtaining an I/O problem model indicating an occurrence of a predetermined I/O problem;
matching the trace information with the I/O problem model;
in response to the trace information matching with the I/O problem model, determining that the predetermined I/O problem occurs at the particular I/O operation layer; and
determining the one or more factors based on the predetermined I/O problem occurring at the particular I/O operation layer.

20. The non-transitory machine-readable medium according to claim 19, wherein obtaining the trace information further comprises:
obtaining first trace information related to each system call invoked by each I/O operation in the storage system; and
wherein determining the one or more factors comprises:
determining the one or more factors by analyzing the first trace information.

21. The non-transitory machine-readable medium according to claim 20, wherein determining the one or more factors by analyzing the first trace information comprises:
determining one of the I/O operations as one of the one or more factors, an input/output (I/O) bandwidth occupied by the determined I/O operation within a predetermined time interval exceeding a second predetermined threshold.

* * * * *